United States Patent [19]

Kobayashi et al.

[11] Patent Number: 5,200,644
[45] Date of Patent: Apr. 6, 1993

[54] AIR CONDITIONING SYSTEM HAVING BATTERY FOR INCREASING EFFICIENCY

[75] Inventors: Takehiro Kobayashi; Kazuhiko Akiyama, both of Fuji, Japan

[73] Assignee: Kabushiki Kaisha Toshiba, Kawasaki, Japan

[21] Appl. No.: 357,780

[22] Filed: May 30, 1989

[30] Foreign Application Priority Data

May 31, 1988 [JP] Japan ................................ 63-133758
May 31, 1988 [JP] Japan ................................ 63-133759

[51] Int. Cl.⁵ .......................................... F24F 11/00
[52] U.S. Cl. ........................................ 307/66; 62/236; 307/103; 318/441
[58] Field of Search .................. 307/44-47, 307/64-68, 48, 43, 53, 56, 59, 72, 73, 75, 85-87, 19, 20, 103; 62/228.4, 236; 318/472, 802, 139, 441; 363/37; 320/13, 14; 361/92

[56] References Cited

U.S. PATENT DOCUMENTS

| | | | |
|---|---|---|---|
| 4,313,060 | 1/1982 | Fickenscher et al. | 307/23 |
| 4,401,895 | 8/1983 | Petkovsek | 307/66 |
| 4,517,471 | 5/1985 | Sachs | 307/67 |
| 4,672,520 | 6/1987 | Ueda et al. | 363/37 |
| 4,720,982 | 1/1988 | Shimizu et al. | 62/204 |
| 4,745,299 | 5/1988 | Eng et al. | 307/66 |

FOREIGN PATENT DOCUMENTS 62-192172 12/1987 Japan .

Primary Examiner—A. D. Pellinen
Assistant Examiner—David Osborn
Attorney, Agent, or Firm—Foley & Lardner

[57] ABSTRACT

An air conditioning system comprises a converter for converting a commercial AC into DC, an inverter for reconverting the DC into an AC having a predetermined frequency corresponding to an air conditioner load, a compressor driven with the AC from the inverter under a compressor capacity control operation matching the load, a battery used for dealing with a voltage drop of the supply power from the commercial AC power source and for supplying a DC different from the DC converted by the converter to the inverter via a switching element, and a discharge control unit for controlling the switching element in the manner that the battery supplies a current having a predetermined value proportional to a difference between the AC supplied from the power source to the converter and a preset current value.

20 Claims, 11 Drawing Sheets

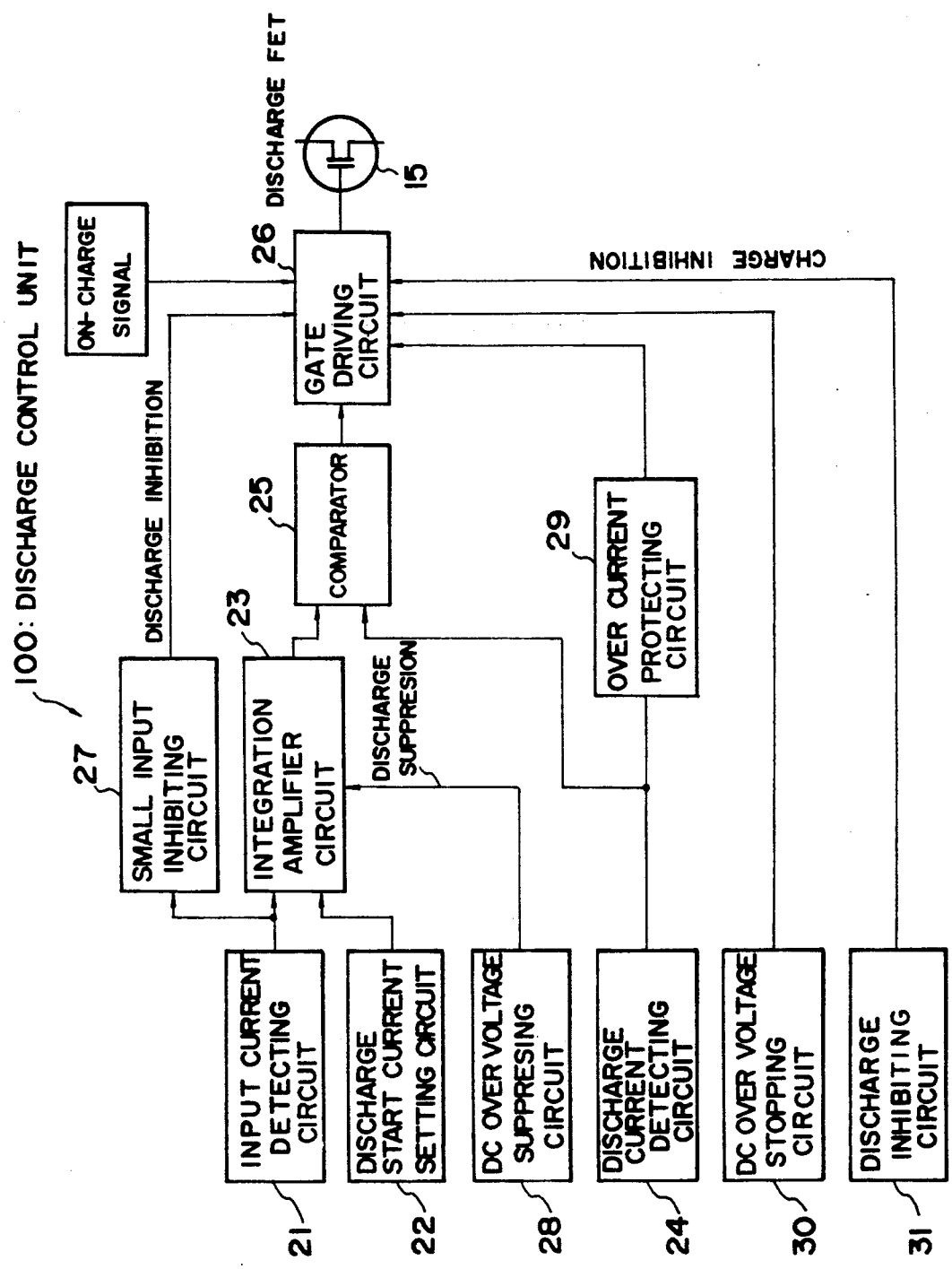
F I G. 4

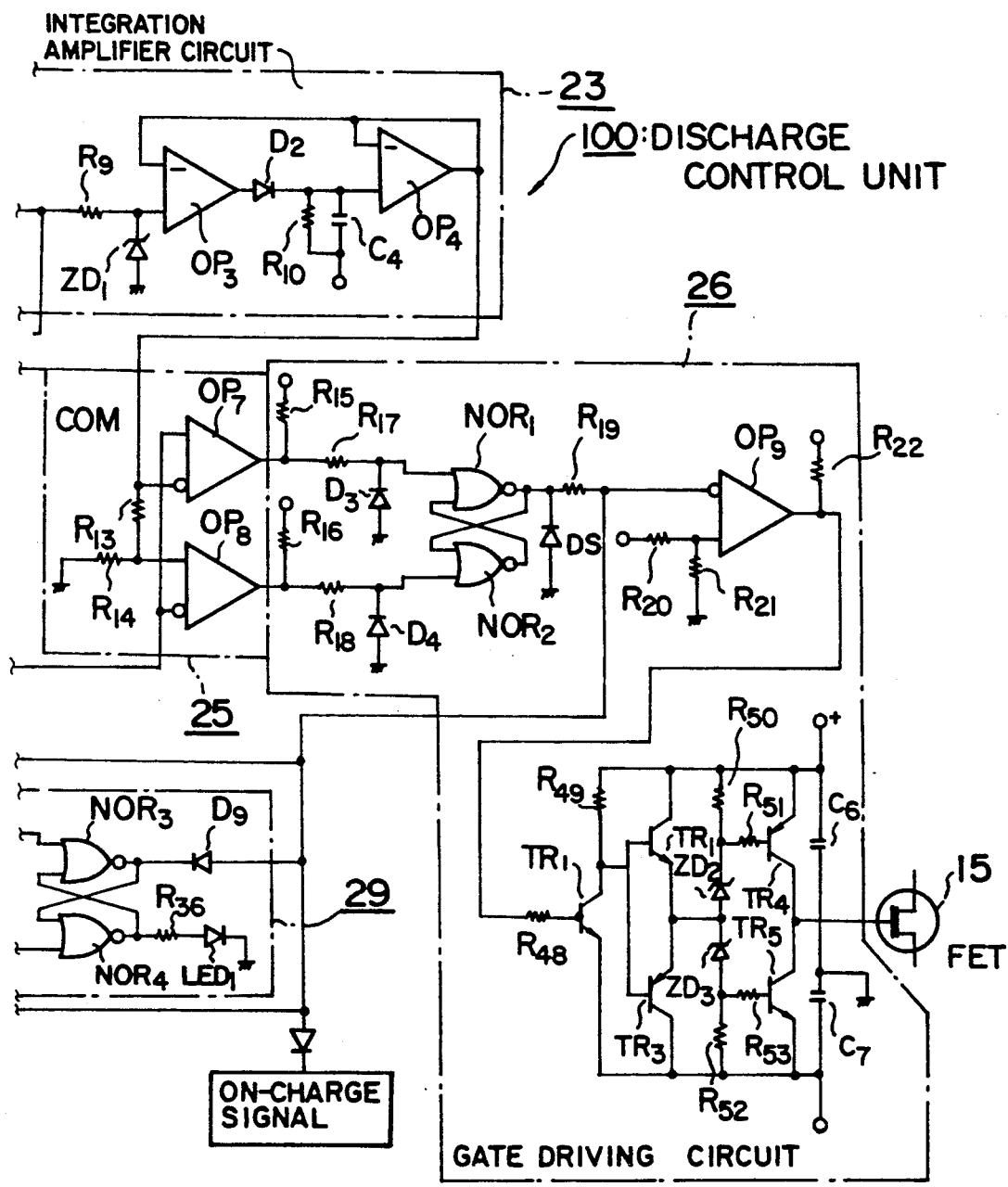
FIG. 7CONT.

divider # AIR CONDITIONING SYSTEM HAVING BATTERY FOR INCREASING EFFICIENCY

BACKGROUND OF THE INVENTION

The present invention relates to an air conditioning system having a battery for dealing with an AC input voltage drop. More particularly, the invention relates to an air conditioning system provided with a converter for converting an AC input to a DC output, an inverter for transforming the DC output from the converter into an AC output which is supplied to a compressor under capacity control operation in accordance with the air conditioner load, and a battery for supplying DC output to the inverter via a switching device.

The operation of a conventional air conditioner system having a battery is as follows. The system, provided with a converter for converting power from a commercial power source into DC output and an inverter for transforming the converter output into AC output which is supplied to a motor for driving a compressor, is controlled to increase the input current as the power source voltage lowers. Therefore, there occurs the phenomenon where the power source voltage of a power transmission system at a high impedance will become further lowered. To deal with such a problem, a battery is provided. For example when an AC power source voltage becomes lower than a preset value, the battery is discharged to suppress the AC input current to a small value. A value set for starting a discharge of the battery and for stopping the discharge is not limited to such a single preset voltage value, but it is also possible to use a first set value of an input current for starting the discharge, and a second set value, smaller than the first set value, of an input current for stopping the discharge. Even with the first and second two input current values set as above, the air conditioning system can suppress the AC input current to a small value.

However, the conventional air conditioning system described above has the following problems associated therewith.

First, in the case of controlling with a set voltage value, a control circuit is provided which causes the battery to be connected to the input circuit of the inverter upon detection of the power source voltage becoming lower than the set value. The control circuit obtains its control power source voltages from an output circuit of the converter. Therefore, if a power failure occurs after the battery was connected because of a drop of the AC power source voltage at that time, the battery connection is maintained even after the power failure, since the control circuit obtains its necessary power from the battery. If the inverter continues to operate under such a condition, the battery is discharged in a short time and at the same time, is either damaged by an excessive discharge, or the life thereof is shortened.

In the case of controlling with two input current set values, the discharge current of the battery is controlled to have a constant value so that power which is otherwise to be supplied from the AC power source, is supplied from the battery. Therefore, the life of the battery is shortened and the running cost of the system becomes higher. This case will be clarified with reference to FIGS. 1 and 2.

The AC input current A is assumed to increase as shown by a solid line in FIG. 1 during the compressor capacity control operation. As the discharge starts when the current reaches a first set value I1, the battery discharge current B increases as indicated by a dotted line. At the same time, the AC input current A decreases to a value slightly larger than a second set value I2, the inverter current C taking the sum of both the currents. Thereafter, when the AC input current becomes the second set value I2 or less because of a reduction of the air conditioner load, the discharge is caused to stop. Then, the AC input current recovers a value slightly smaller than the first set value I1, and running only with the AC power source proceeds thereafter.

With the above control, a certain width or hysteresis width is necessary between the first and second set values. If power corresponding only to the hysteresis width is arranged to be supplied not from the battery but from the AC power source, and only insufficient power is arranged to be supplied from the battery as shown in FIG. 2, then the amount of consumption of the battery power which is relatively expensive, can be suppressed, and in addition, the number of chargings can be reduced. However, a conventional air conditioning system does not adopt such an arrangement, resulting in a shortened battery life and high running cost of the system.

SUMMARY OF THE INVENTION

It is a principal object of the present invention to provide an air conditioning system capable of lengthening the battery life and reducing the running cost of the system in such a manner that a discharge control unit controls the discharge current in accordance with the difference between an input current and a set value.

It is another object of the present invention to provide an air conditioning system allowing a long battery life and preventing a performance deterioration in such a manner that a discharge inhibiting means detects non-establishment of the input power source voltage and inhibits excessive discharge of the battery even if a power failure occurs after the battery is connected to the main circuit portion of the system.

To achieve the above objects, the air conditioning system of this invention is provided with a discharge control unit for controlling a switching element connected serially to the battery in such a manner that the battery is caused to be discharged at a discharge current value corresponding to the difference between an input current of the converter and the set value if the input current of the converter exceeds the set value.

The air conditioning system is further provided with a discharge inhibiting means which detects non-establishment of the input power source voltage of the converter, and inhibits the discharge of the battery.

According to the present invention, although the battery is controlled in a similar manner to the conventional system in that the battery is discharged on the condition that the input current of the converter exceeds a certain set value, the discharge current is controlled to a value corresponding to the difference between the input current of the converter and the set value. Therefore, the amount of consumption of the battery power which is more expensive than the power obtained from the AC power source can be suppressed to a small value, resulting in a long battery life and a low running cost of the system.

Furthermore, according to the present invention, the discharge of the battery is inhibited by a discharge inhibiting means on the condition that the input power source voltage of the converter is not still established. Therefore, even if a power failure or the like occurs while the battery is connected, excessive discharge of the battery is avoided without giving any adverse effect to the battery life and battery performance.

As described above, if the input current of the converter exceeds a preset value, the battery is caused to be discharged while controlling to set the discharge current at a value corresponding to the difference between the input current of the converter and the preset value. Therefore, the amount of consumption of the battery power which is more expensive than the power from the AC power source can be suppressed to a low value, thus providing another advantageous effect of elongating the life of the battery and reducing the running cost of the air conditioning system.

Furthermore, there is provided a discharge inhibiting means for inhibiting discharge of the battery. Therefore, even if a power failure or the like occurs while the battery is connected and if the input power source voltage of the converter is not still established, excessive discharge of the battery can be avoided, thus not adversely affecting the battery life or battery performance.

BRIEF DESCRIPTION OF THE DRAWINGS

FIG. 4 is a block diagram showing the structure of the discharge control unit of the first embodiment;

DETAILED DESCRIPTION OF THE PREFERRED EMBODIMENTS

Preferred embodiments of an air conditioning system having a battery according to the present invention will be described in detail with reference to the accompanying drawings.

Figure 1:
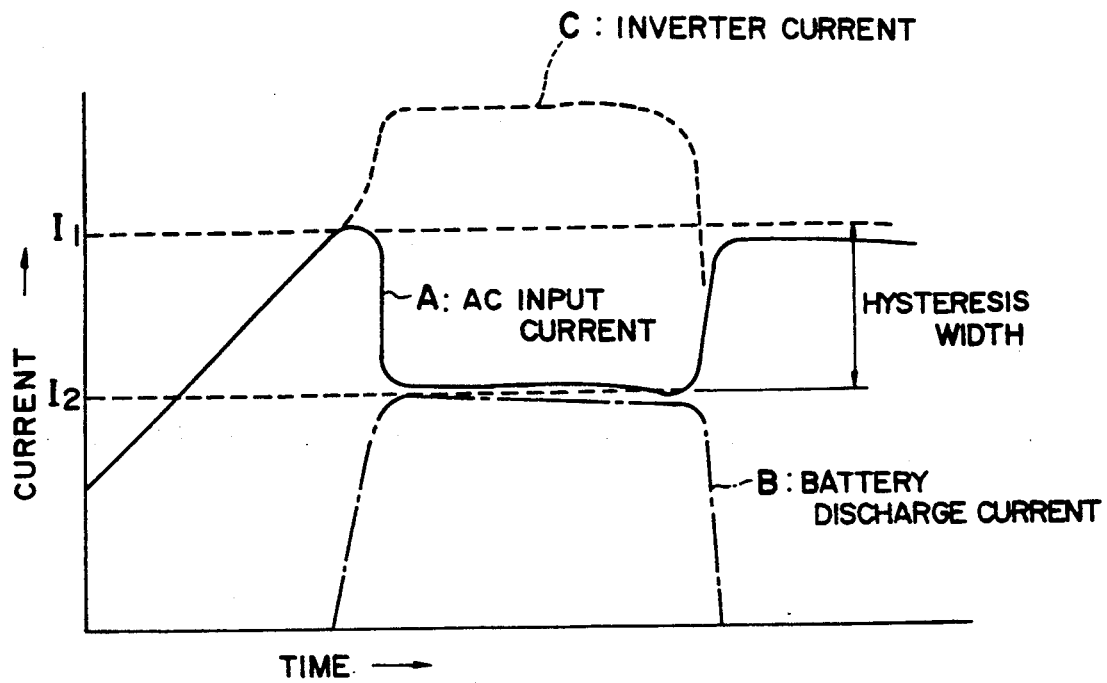
FIG. 1 is a graph showing the input current characteristics during the discharge control of a battery in a conventional air conditioning system.
Figure 2:
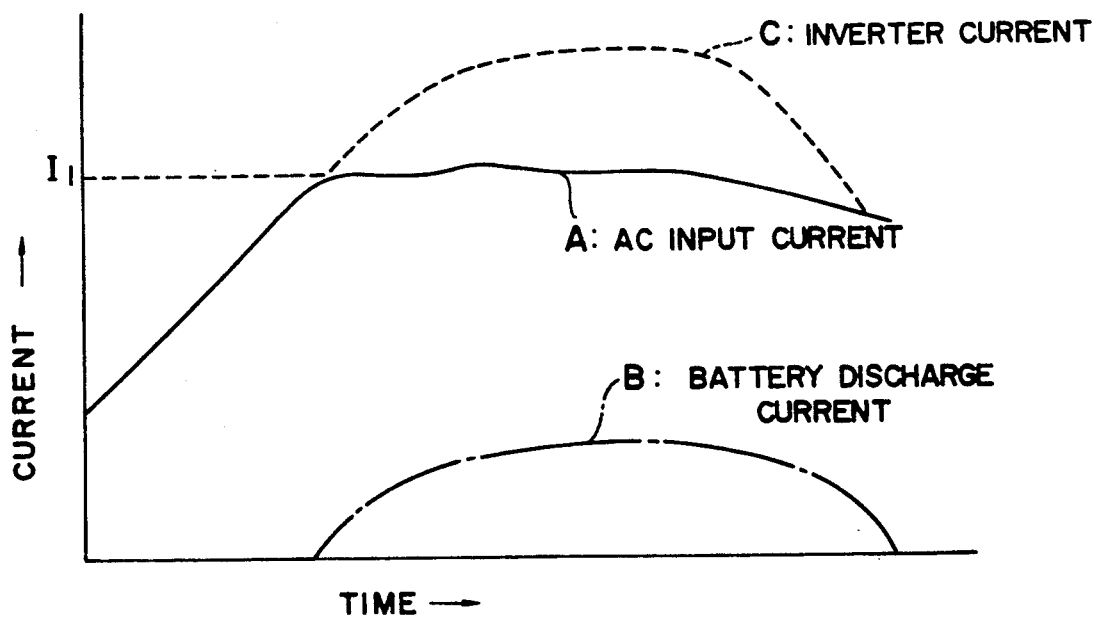
FIG. 2 is a graph showing the input current characteristics during preferred discharge control of a battery in a general air conditioning system.
Figure 3:
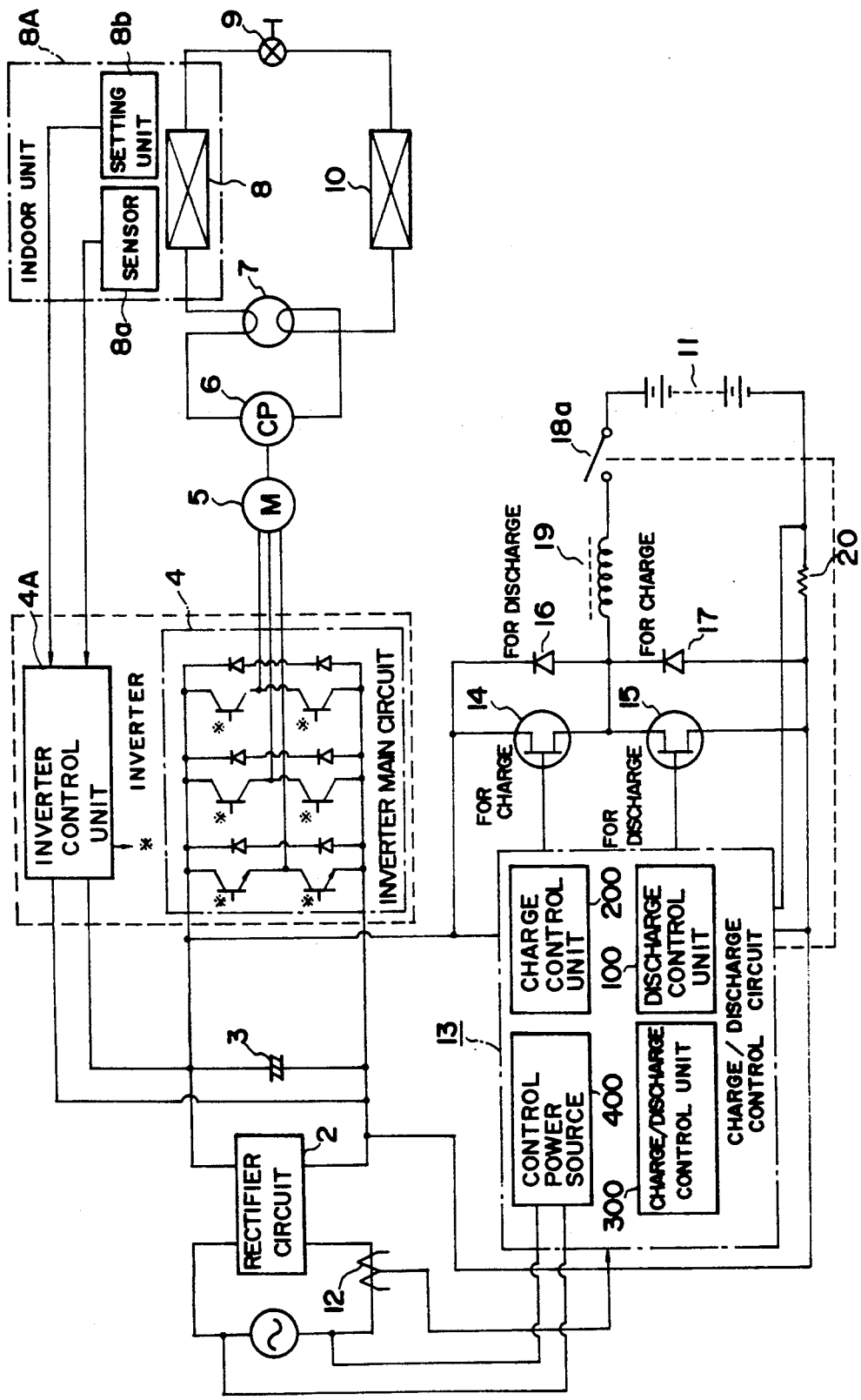
FIG. 3 is a block diagram showing the entire structure of a first embodiment of an air conditioning system of this invention.

FIG. 3 is a schematic diagram showing the structure of a first embodiment of an air conditioning system with a power conversion system (also called a main circuit) according to the present invention. In FIG. 3, an AC power source 1 is connected to the AC terminals of a rectifier circuit 2 serving as a converter. Connected to the DC terminals thereof are a smoothing capacitor 3 and the DC terminals of an inverter 4. Connected to the AC terminals thereof is a motor 5 which drives a compressor 6. The compressor 6 along with a four-way valve 7, indoor heat exchanger 8, expansion valve 9 and outdoor heat exchanger 10 constitutes a well known freeze cycle. In an inverter main circuit constructed of the inverter 4 and an inverter control circuit 4A, the inverter 4 is connected to an inverter control circuit 4A which is powered with a DC current from the rectifier circuit 2 and outputs control commands to respective transistors of the inverter 4. The inverter control circuit 4A controls the inverter 4 in accordance with information such as room temperature detected with a sensor 8a and with setting room temperature by a setting unit 8b, the sensor 8a and setting unit 8b of which are mounted on an indoor unit 8A which includes the indoor heat exchanger 8.

A battery 11 is provided on the DC side of the inverter 4. In order to control the power supply/reception of the battery 11, namely, in order to control the charge/discharge of the battery 11, there are provided a current transformer 12, charge/discharge control circuit 13, FET 14 as a switching element for charging the battery, FET 15 as a switching element for discharging the battery, discharge diode 16, charge diode 17, power relay (not shown) with a contact 18a, reactor 19, and current detecting shunt resistor 20.

The current transformer 12 is coupled between the AC power source 1 and the rectifier circuit 2 so that a charge/discharge control circuit 13 is inputted with an AC signal. The discharge diode 16 is connected in parallel with the charge FET 14, whereas the charge diode 17 is connected in parallel with the discharge FET 15. The serial circuit of these elements is connected across the opposite ends of the capacitor 3 and charge/discharge control circuit 13. Connected to the opposite ends of the discharge FET 15 is a serial circuit composed of the reactor 19, contact 18a, battery 11 and shunt resistor 20 in the order recited. The interconnection between the battery 11 and shunt resistor 20 is also connected to the charge/discharge control circuit 13 so that a current signal passing through the shunt resistor 20 is picked up by the charge/discharge control circuit 13. The charge/discharge control circuit 13 is composed of a discharge control unit 100, charge control unit 200 and charge/discharge control unit 300. The charge/discharge control circuit 13 controls turn on and off of the contact 18a, and respective gates of the charge FET 14 and discharge FET 15, mainly in accordance with an output signal from the current transformer 12, a current signal from the shunt resistor 20, and a DC voltage signal from the inverter 4.

The detailed construction and operation of the charge/discharge control circuit 13 will be given later. The operation of the air conditioning system of this embodiment will first be described briefly.

The rectifier circuit 2 two-hold-voltage rectifies an AC current from the AC power source 1 and transforms it into a DC current which is smoothed by the capacitor 3. The smoothed DC current is supplied to the inverter 4 which then converts the DC current to an AC current having a frequency matching the air conditioner load and supplies it to the motor 5. The motor 5 drives the compressor 6 constituting the freeze cycle. In this case, the three-phase bridge-connected switching elements of the inverter 4 are controlled to be turned on and off at the timings of the frequency matching the air conditioner load, under the control of the inverter control unit 4A. Thus, the compressor 6 is driven under its capacity control operation.

The charge/discharge control circuit 13 causes the battery 11 to discharge in accordance with an output signal from the current transformer 12, when the value of the AC input current exceeds a set value. During the discharge, the contact 18a is turned on so that the inverter 4 is supplied with AC power via the reactor 19 and discharge diode 16, and that the discharge current is controlled by turning on and off the discharge FET 15.

When the charge/discharge control circuit 13 causes the battery 11 to be charged, the contact 18a is turned on so that a charge current is supplied via the reactor 19 and contact 18a while turning on and off the charge FET 14, and also via the charge diode 17 with the aid of the reactor 19.

FIG. 4 is a block diagram of the discharge control unit 100 of the charge/discharge control circuit 13. The discharge control unit 100 is provided with an input current detecting circuit 21 for detecting an AC input current on the basis of an output signal from the current transformer 12, and a discharge start current setting circuit 22 for setting a discharge start current. The detected AC input current and discharge start current are supplied to an integration amplifier circuit 23 which compares them with each other. On condition that the AC input current exceeds the discharge start current, the difference therebetween is integrated to generate a voltage signal associated with the discharge current of the battery 11. The discharge control unit 100 is also provided with a discharge current detecting circuit 24 which receives a voltage across the shunt resistor 20 to detect an actual discharge current. A comparator 25 compares an output signal from the integration amplifier circuit 23 with an output from the discharge current detecting result of circuit 24, and outputs a logical signal corresponding to the comparison. In accordance with the logical signal, a gate driving circuit 26 controls turn on and off the discharge FET 15.

The discharge control unit 100 operates to inhibit the discharge control when an AC input current is low or the voltage of the AC power source is not established, namely, when the AC power source has a current or voltage value smaller than a preset value. To this end, a small input inhibiting circuit 27 receives an output signal from the input current detecting circuit 21 and outputs a discharge inhibiting signal to the gate driving circuit 26 when the output signal from the input current detecting circuit 21 is smaller than a preset value.

On the contrary, the discharge control unit 100 operates to suppress an over voltage across the capacitor 3 to be applied to the inverter 4. To this end, there is provided a DC over voltage suppressing circuit 28 which functions to lower an integration voltage at the integration amplifier circuit 23, so that discharge current of the battery 11 decreases by reducing the integration voltage. Furthermore, to prevent excessive discharge current which may destruct the battery 11, there is provided a discharge current limiting circuit to be described later.

Furthermore, to prevent destruction of the discharge FET 15 due to the continuous on-state thereof and its excessive discharge current, an over current protection circuit 29 is provided which receives a signal from the over current detecting circuit 24 and outputs a discharge inhibiting signal to the gate driving circuit 26 when the signal from the over current detecting circuit 24 exceeds a preset value. Still further, it is necessary to fully stop the discharge operation when the input voltage to the inverter 4 becomes excessive, so that there is provided a DC over voltage stopping circuit 30 which supplies a discharge inhibiting signal to the gate driving circuit 30 when the input voltage to the inverter 4 exceeds a preset value. Still furthermore, to inhibit the discharge operation while a control power source voltage is not established, a discharge inhibiting circuit 31 is provided for outputting a discharge inhibiting signal when the control power source voltage becomes lower than a preset value.

Figure 5:
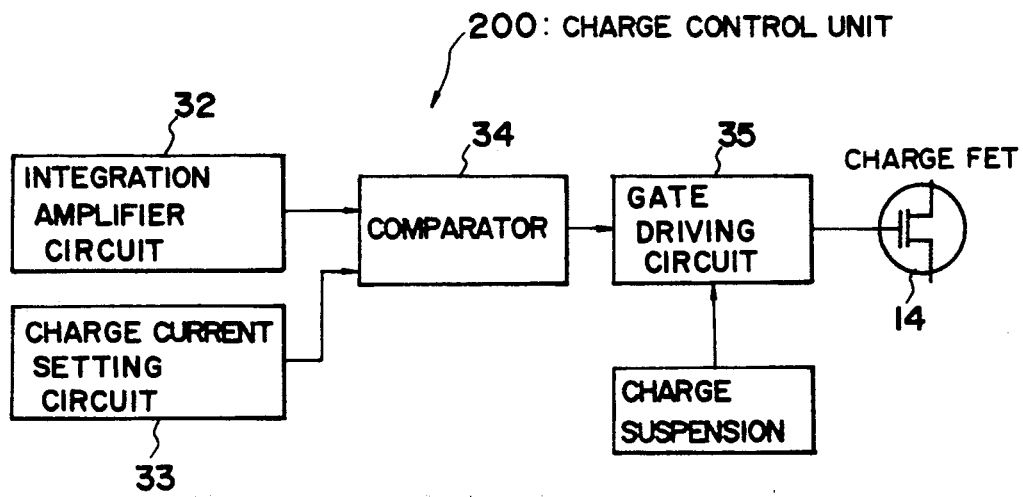
FIG. 5 is a block diagram showing the structure of the charge control unit of the first embodiment.

FIG. 5 is a block diagram showing the structure of the charge control unit 200 of the charge/discharge control circuit 13. In FIG. 5, an integration amplifier circuit 32 receives a voltage across the shunt resistor 20 and integration-amplifies it to generate a voltage corresponding to an actual charge current, and which voltage is applied as one input to a comparator 34. A charge current setting circuit 33 sets an optimum charge current for the battery 11, the set value being applied as the other input to the comparator 34. The comparator 34 compares the two values with each other to output a logical signal corresponding to the result of comparison. A gate driving circuit 35 controls turn on and off of the charge FET 14 in accordance with an output from the comparator 34. The gate driving circuit 35 is supplied with a charge suspension signal, to be described later.

Figure 6:
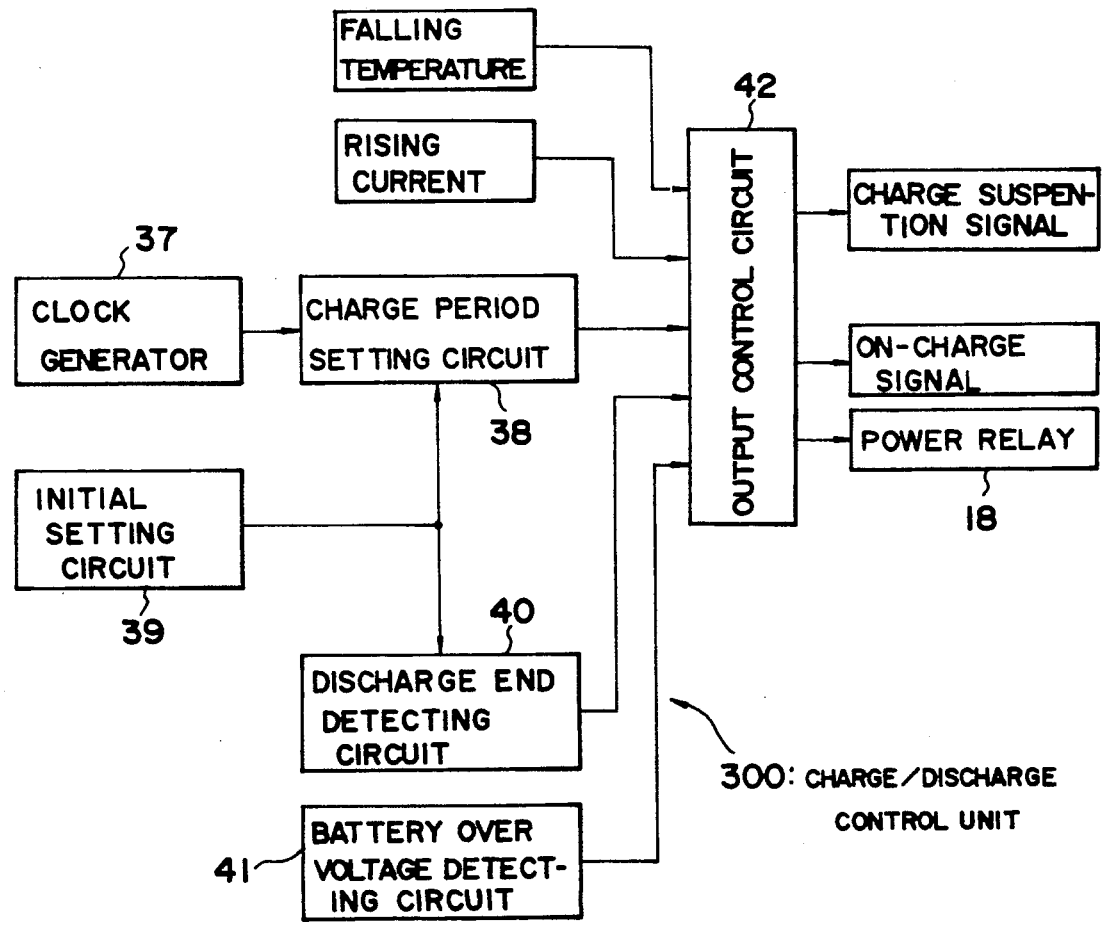
FIG. 6 is a block diagram showing the structure of the charge/discharge control unit of the first embodiment.

FIG. 6 is a block diagram showing the structure of the charge/discharge control unit 300 of the charge/discharge control circuit 13. In FIG. 6, a clock generator 37 generates a clock pulse at each zero cross point of an input AC power source voltage. A charge period setting circuit 38 counts the clock pulses, and outputs a charge suspension signal after a predetermined time lapse from a reset time, e.g., after a lapse of 15 hours from the reset time. In this case, an initial resetting circuit 39 generates a single pulse upon the detection that an output voltage of a control power source 400 is over the preset value, and the power source 400 receives power from the AC power source and produces various DC voltages. The generated pulse resets the charge period setting circuit 38. A discharge end detecting circuit 40 detects the voltage of the battery 11, for example, the voltage of one block of serially connected battery cells. If the detected voltage is lower than a preset value, it is considered that the discharge has completed. Then, the discharge end detecting circuit 40 outputs a discharge inhibiting signal.

In the meantime, it is necessary to stop charging the battery after it has been charged fully and to prevent it from deteriorating. To this end, there is provided a battery over voltage detecting circuit 41 which upon detection of an over voltage of the battery, outputs a charge inhibiting signal. The function of batteries, such as nickel cadmium batteries, is degraded as the temperature lowers to a certain value. If a charge current is taken from the inverter main circuit under the conditions that the temperature is higher than the certain value, and that the inverter main circuit current is larger than a preset value, then it is possible to break an outlet and cord of the power source by exceeding the current capacity of the outlet. In view of this, an output control circuit 42 outputs either an on-charge signal allowing a discharge or a charge inhibiting signal inhibiting the charge, on the basis of the output signals from the charge period setting circuit 38, discharge end detecting circuit 40, and battery over voltage detecting circuit 41, while taking into consideration the condition that the current of the inverter main circuit does not increase. The output control circuit 42 also controls a power relay 18.

Figure 7:
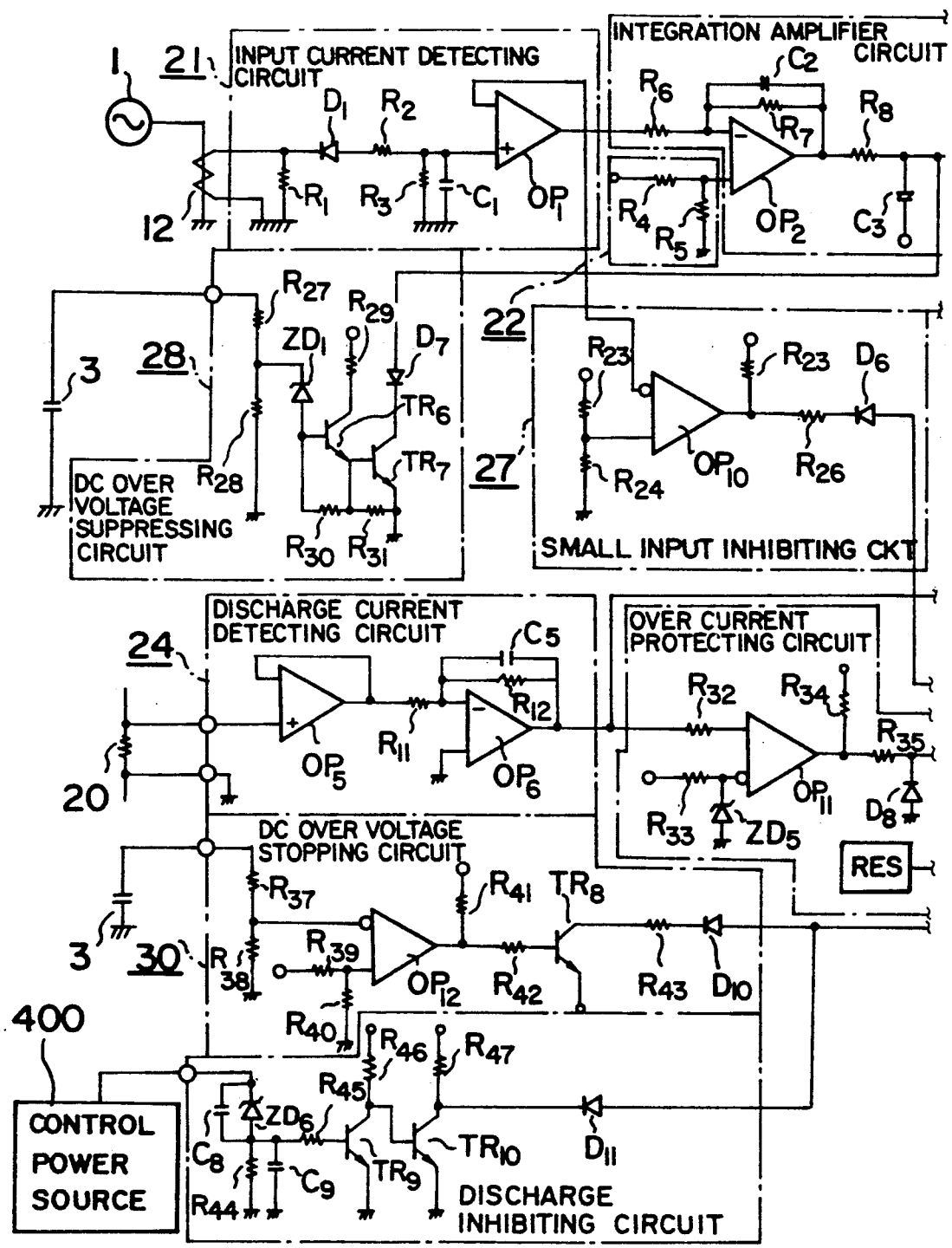
FIG. 7 is a circuit diagram showing the particular and detailed circuit arrangement of the discharge control unit and discharge FET driving unit of the first embodiment.

FIG. 7 is a circuit diagram showing the particular circuit arrangement of the discharge control unit 100 wherein the rectifier circuit 2 is of a two-hold voltage rectification type, and the battery 11 is constructed of serially connected eight blocks each comprising serially connected ten nickel cadmium battery cells of 1.2 V. A nickel cadmium battery has an excellent charge/discharge characteristics such that it can be charged within a temperature range of 0 to 45 degrees centigrade, and is highly resistive to over charge/discharge and is durable for a long time.

In the input current detecting circuit 21, a current from the current transformer 12 is caused to flow through a resistor R1. A DC voltage proportional to the current is generated across a parallel circuit composed of a resistor R3 and capacitor C1. The generated voltage is amplified by an operational amplifier OP1 to output a voltage signal proportional to the AC input current.

The discharge start current setting circuit 22 is constructed of serially connected resistors R4 and R5 which divide a DC voltage of the control power source 400 to thus output a voltage signal corresponding to the charge start current. The discharge start current is set in this embodiment at 19 A which is 95% of a maximum current of 20 A allowed to flow through the rectifier circuit 2.

In the integration amplifier circuit 23, a primary delay differential amplifier circuit is constructed of an operational amplifier OP2, resistors R6 and R7, and capacitor C2. The differential amplifier circuit compares an output voltage from the input current detecting circuit 21 with the voltage set by the discharge start current setting circuit 22, and integrates the difference therebetween. The output from the differential amplifier is delayed by a delay circuit constructed of a resistor R8 and capacitor C3. The delay circuit functions to suppress a rapid increasse of a discharge current caused by a rapid increase of the AC input current, and prevent hunching of the input current. A peak hold circuit is constructed mainly of a zener diode ZD1, and operational amplifiers OP3 and OP4. The zener diode ZD1 limits the output from the delay circuit so that the maximum effective discharge current of the battery is limited. The peak hold circuit prevents the essential inverter control from not being stopped due to hunching of the AC input current when the discharge is suddenly stopped in the case of a rapid decrease of the AC input current, or in the case of small capacity of the battery 11.

In the discharge current detecting circuit 24, two stage operational amplifiers OP5 and OP6 amplify the voltage across the shunt resistor 20 to thus output a voltage signal corresponding to the discharge current.

In the comparator 25, an output voltage from the integration amplifier circuit 23 is applied to a serial circuit of a resistor R13 and resistor R14. An operational amplifier OP7 compares a voltage across the serial circuit with an output voltage from the integration amplifier circuit 23. An operational amplifier OP8 compares a divided voltage at the serial circuit with an output voltage from the integration amplifier circuit 23. Since the integration amplifier circuit 23 generates a negative voltage in the order of several mV when an input current from the AC power source 1 is lower than the preset value, the outputs of the operational amplifiers OP7 and OP8 are low "L" and high "H" level, respectively, as the initial conditions. When the integration amplifier circuit 23 generates a certain voltage signal, the output of the operational amplifier OP7 is inverted to the "H" level. By the "H" signal, the discharge FET 15 is turned on, then the discharge current flows from the battery 11 to the inverter main circuit 4. Thereafter, when the discharge current detecting circuit 24 detects an actual discharge current and increases its output voltage, the initial condition is recovered.

The gate driving circuit 26 is constructed of a flip-flop of NOR gates NOR1 and NOR2, an operational amplifier OP9 for comparing an output from the flip-flop with a constant voltage, and a driver circuit including transistors TR2 to TR5. If the output of the operational amplifier OP7 of the comparator 25 is the "L" level, the output of the NOR gate NOR1 is the "L" level and the output of the operational amplifier OP9 is the "H" level. In addition, the transistors TR1 and TR5 of the driver circuit are turned on and the discharge FET 15 is supplied with a negative bias and turned off. Conversely, if the output of the operational amplifier OP7 of the comparator 25 is the "H" level, the output of the NOR gate NOR1 is the "H" level and the output of the operational amplifier OP9 is the "L" level. In addition, the transistor TR2 of the driver circuit is turned off whereas the transistor TR4 is turned on. Therefore, a positive bias is supplied to the discharge FET 15 to turn it on. In the above manner, the discharge current is controlled to have a value corresponding to an output voltage of the integration amplifier circuit 23.

The DC over voltage stopping circuit 30 is constructed mainly of a zener diode ZD4, and transistors TR6 and TR7. When the voltage across the capacitor 3 exceeds the zener voltage of the zener diode, e.g., 250 V, the transistors TR6 and TR7 are turned on so that the voltage across the capacitor C3 of the integration amplifier circuit is lowered to thus reduce the discharge current. In the above manner, the voltage across the capacitor 3 is suppressed to 250 V or.

The over voltage protecting circuit 29 is constructed of a reference voltage circuit including a zener diode ZD5, an operational amplifier OP11 for comparing an output voltage from the discharge current detecting circuit 24 with the reference voltage, and a flip-flop circuit of NOR gates NOR3 and NOR4. When an output from the discharge current detecting circuit 24 exceeds the reference voltage of the zener diode ZD5 corresponding to an allowable discharge current of, e.g., 8 A, the output of the operational amplifier OP11 is inverted to the "H" level and the output of the NOR gate NOR3 is inverted to the "L" level. Therefore, even if the inverting terminal of the operational amplifier OP9 of the gate driving circuit 26 is the "H" level and the system is in the discharge operation, the input to the inverting terminal is forced to change to the "L" level, inhibiting the discharge operation.

The DC over voltage stopping circuit 30 is provided with a serial resistor circuit for dividing the voltage across the capacitor 3 with resistors R37 and R38, another serial resistor circuit for dividing the reference voltage with resistors R39 and R40, an operational amplifier OP12 for comparing the divided voltages, and a transistor TR8 for inverting the output of the operational amplifier. When the voltage across the capacitor 3 exceeds a certain value, e.g., 270 V, the transistor TR8 turns on so that the inverting terminal of the operational amplifier OP9 of the gate driving circuit 26 is made the "L" level to thus inhibit the discharge operation.

In the discharge inhibiting circuit 31, a zener diode ZD6 is serially connected to a parallel circuit of a resistor R44 and capacitor C9. A DC voltage of the control power source 400 is applied across the serial circuit. The interconnection between the zener diode ZD6 and the parallel circuit of the resistor R44 and capacitor C9 is connected to the base of a transistor TR9, whose collector is connected to the base of a transistor TR10. When the output voltage of the control power source 400 exceeds the zener voltage of the zener diode ZD6, the transistor TR9 turns on and the transistor TR10 turns off. However, when the output voltage of the control power source 400 becomes the zener voltage of the zener diode ZD6 or less, the state of transistors TR9 and TR10 is inverted so that the inverting input of the operational amplifier OP9 of the gate driving circuit 26 is made the "L" level, to inhibit the discharge operation. The discharge inhibiting circuit 31 thus inhibits the discharge operation, on the condition that the output voltage of the control power source 400 is not still established.

Figure 8:
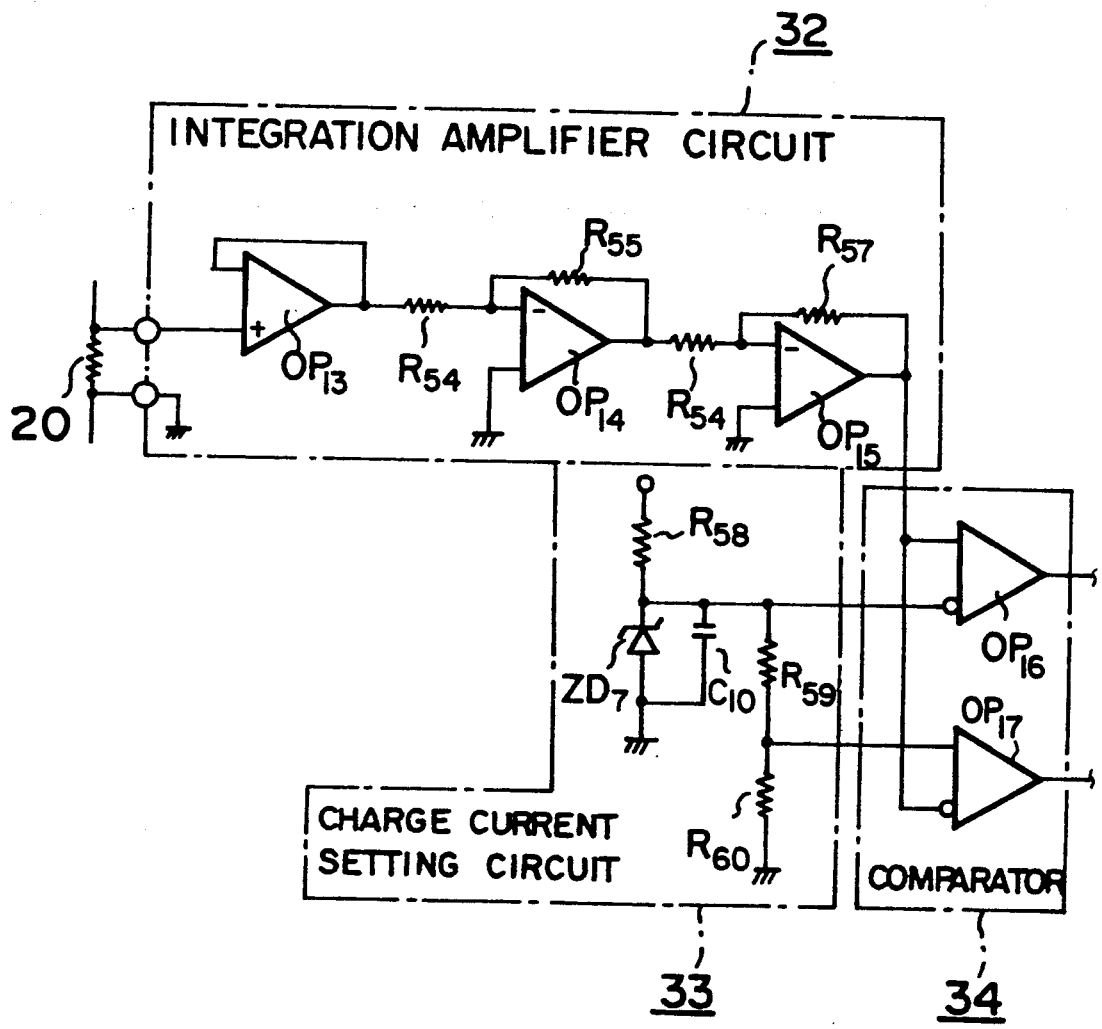
FIG. 8 is a circuit diagram showing the particular and detailed circuit arrangement of the charge control unit and charge FET driving unit of the first embodiment.
Figure 8:
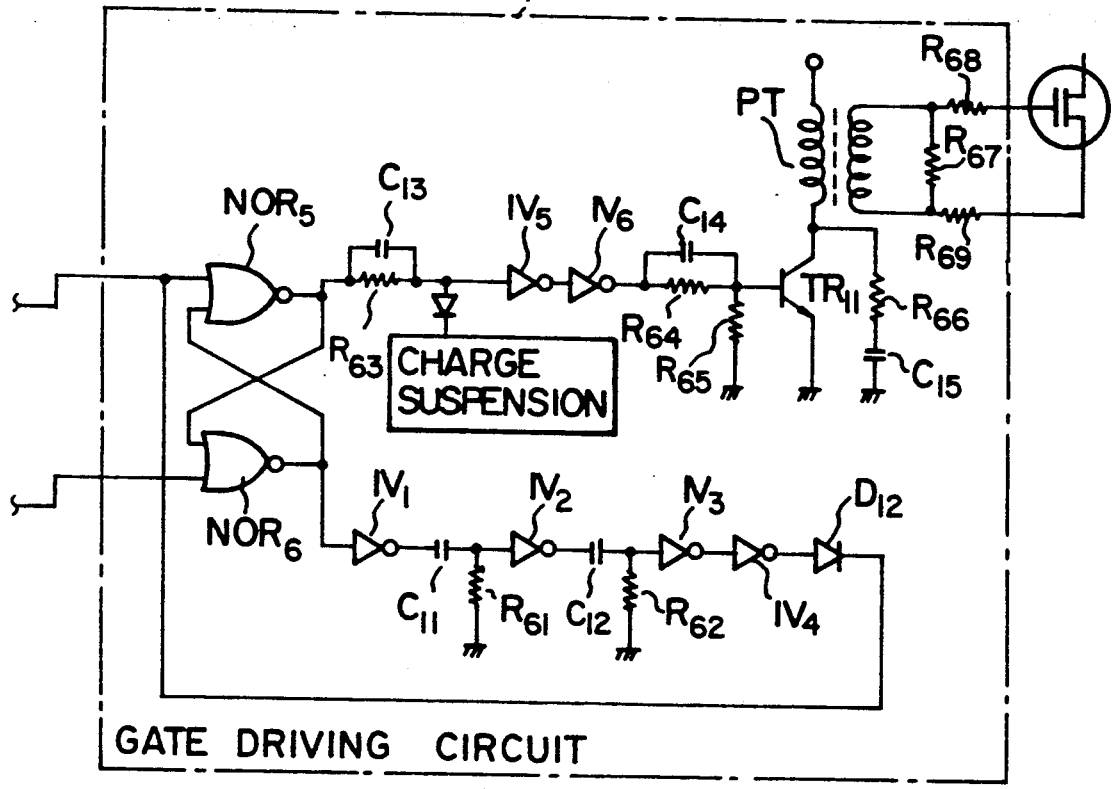

FIG. 8 is a circuit diagram showing the particular circuit arrangement of the charge control unit 200 of the charge/discharge control circuit 13 for control of the charging of the battery 11.

In the charge current setting circuit 33, a resistor R58 is serially connected to a parallel circuit of a zener diode ZD7 and capacitor C10. A DC voltage (not shown) is applied across the serial circuit to generate a voltage corresponding to a charge current of 0.1 C=350 mA which voltage is applied across a serial circuit made of resistors R59 and R60. In this manner, the charge current setting circuit 33 outputs a voltage corresponding to 350 mA and a voltage corresponding to relatively small 35 mA.

The comparator 34 is made of two operational amplifiers OP16 and OP17. The non-inverting terminal of the operational amplifier OP16 has applied thereto an output from the integration amplifier circuit 32, and the inverting terminal thereof is applied with the voltage corresponding to 350 mA from the charge current setting circuit 33. The non-inverting terminal of the operational amplifier OP17 has applied the voltage corresponding to 35 mA from the charge current setting circuit 33, and the inverting terminal thereof is applied with an output from the integration amplifier circuit 32. Under zero charge current, the output of the operational amplifier OP16 is the "L" level, and the output of the operational amplifier OP17 is the "H" level. As the charge current increases, and the output voltage of the integration amplifier circuit 32 exceeds the voltage corresponding to 350 mA, the output of the operational amplifier OP16 changes to the "H" level and that of the operational amplifier OP17 changes to the "L" level. As the charge current decreases and the output voltage of the integration amplifier circuit 32 becomes lower than the voltage corresponding to 35 mA, the output of the operational amplifier OP16 changes to the "L" level and that of the operational amplifier OP17 changes to the "H" level.

The gate driving circuit 35 is constructed of a flip-flop made of NOR gates NOR5 and NOR6, a timer circuit made of inverters IV1 and IV4, capacitors C11 to C12, resistors R61 and R62, diode D12, a pulse generator made of capacitors C13 to C15, resistors R63 to R69, inverters IV5 and IV6, transistor TR11 and pulse transformer PT. If the charge current is smaller than 350 mA, and the output of the operational amplifier OP16 is the "L" level and that of the operational amplifier OP17 is the "H" level, then the output of the NOR gate NOR5 constituting the flip-flop is the "H" level, and the output of the NOR gate NOR6 is the "L" level. If the output of the NOR gate NOR5 is the "H" level, the transistor TR11 turns on so that a pulse signal is supplied to the charge FET 14 via the pulse transformer PT to turn it on. If the charge speed is slow and the on-time of the transistor TR11 is long, there is a possibility of destroying the transistor TR11. For this reason, the state of flip-flop is caused to be inverted upon inversion of the output level of the timer circuit made of the inverters IV1 to IV4, capacitors C11 to C12 and the like, so that the transistor TR11 is turned off and protected from being destroyed. If the charge current exceeds 350 mA, the state of the NOR gates NOR5 and NOR6 is inverted to thus inhibit the charge operation. If the charge current becomes 35 mA or less, the state of the NOR gates NOR5 and NOR6 is again inverted to thus start the charge operation. The above operations are repeated to continue charging the battery 11 until the charge suspension conditions are met.

Figure 9:
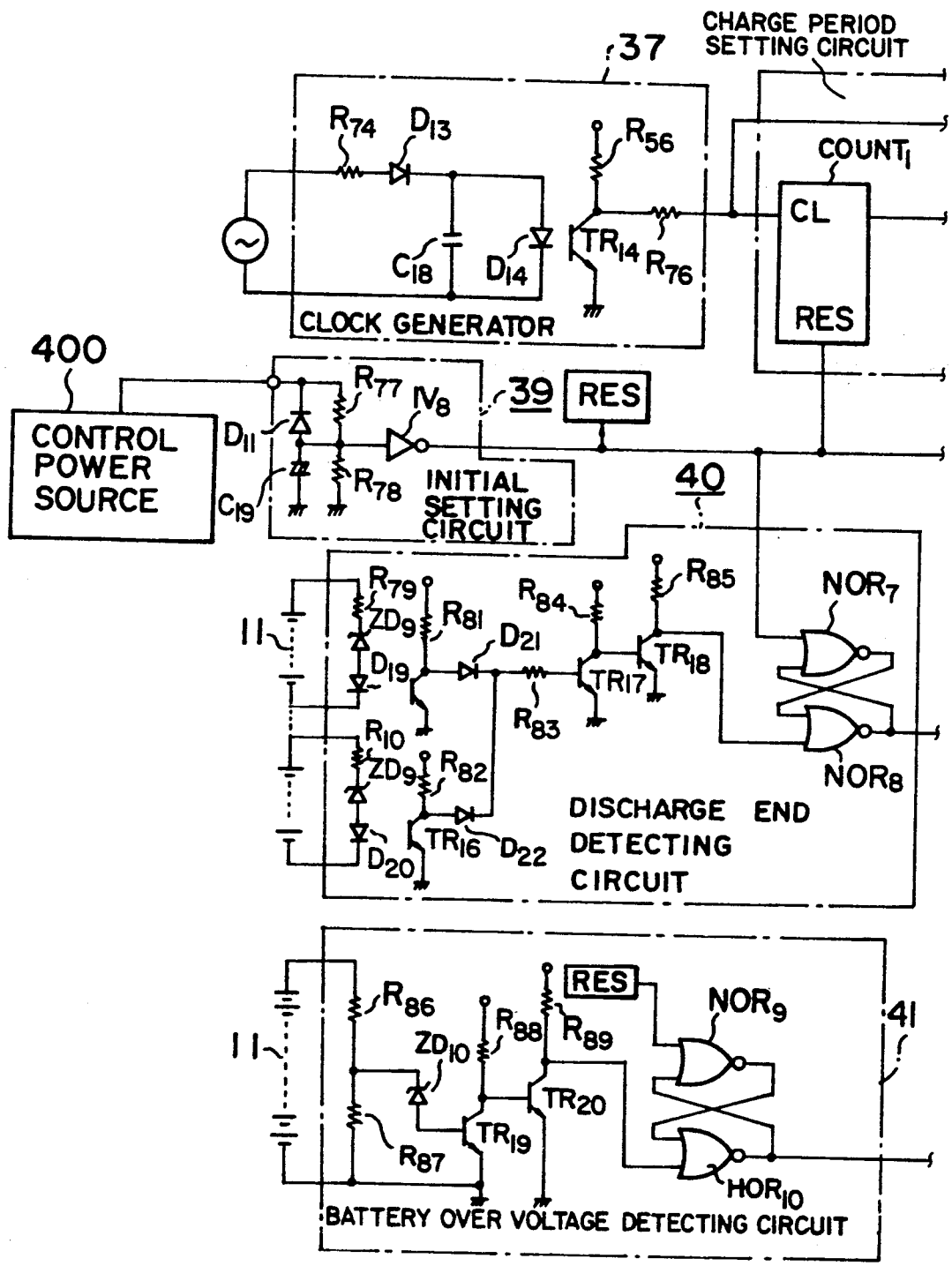
FIG. 9 is a circuit diagram showing the particular and detailed circuit arrangement of the charge/discharge control unit of the first embodiment.
Figure 9:
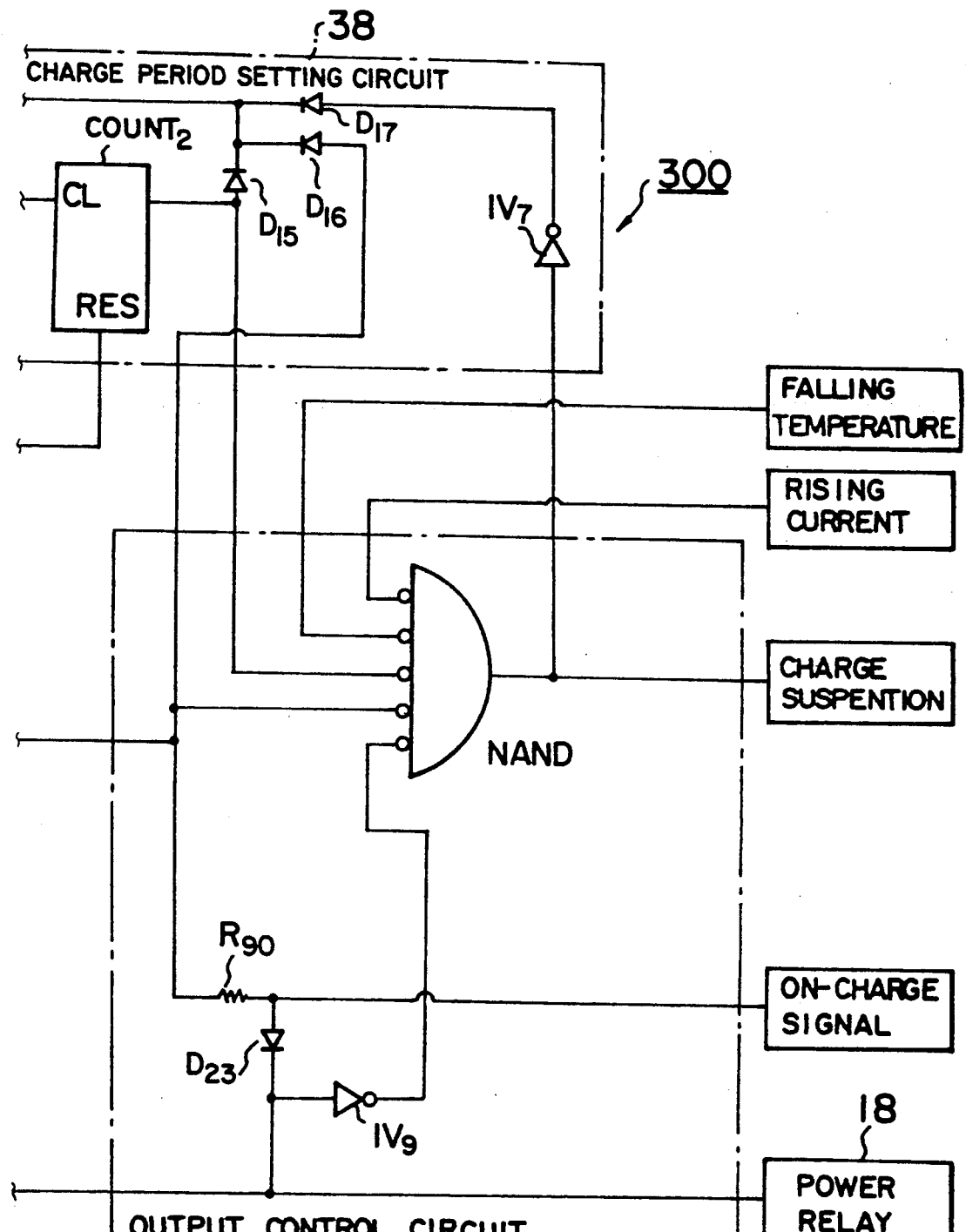

FIG. 9 is a circuit diagram showing the detailed arrangement of the charge/discharge control unit 300. In the clock generator 37, a half wave of the AC input current is caused to flow through a light emitting diode D14 constituting a photocoupler via a resistor R74 and diode D13 so that a photo transistor TR14 constituting the photocoupler outputs a clock pulse at its collector. A clock pulse is therefore generated at each cycle of the AC power source voltage.

The charge period setting circuit 38 is mainly constructed of two counters COUNT1 and COUNT2, and diodes D15, D16 and D17. The counter COUNT1 counts a clock pulse from the clock generator 37, whereas the counter COUNT2 counts the number of overflows generated at the counter COUNT1 to output after a lapse of 15 hours a signal of the "H" level for inhibiting the charge operation. The signal is fed back to the input of the counter COUNT1 to stop the count operation.

In the initial resetting circuit 39, a parallel circuit of a diode D18 and resistor R77 is serially connected to a parallel circuit of a capacitor C19 and resistor R78. The output voltage of the control power source 400 is applied across the two parallel circuits. A voltage at the intersection between the two parallel circuits is via an inverter IV8. Therefore, when the output voltage of the control power source 400 is established, a single pulse is outputted to reset the counters COUNT1 and COUNT2, and to reset the flip-flop of the charge end detecting circuit 40 described below.

Furthermore, since the output pulse is supplied to the battery over voltage detecting circuit 41 of the control unit 300 and the over current protecting circuit 29 of the control unit 100, as shown in FIG. 7, the circuits 29 and 41 are reset at the same time.

The charge end detecting circuit 40 checks the voltage across each block of the battery 11. The first block is connected to a series circuit made of resistor R79, zener diode ZD8 and light emitting diode D19 constituting a photocoupler, the collector voltage of a photo transistor TR15 constituting the photocoupler being applied to the base of the photo transistor TR17. Connected to the eighth block is a serial circuit made of resistor R80, zener diode ZD9, and a photodiode D20 constituting a photocoupler, the collector voltage of a photo transistor TR16 constituting the photocoupler being applied to the base of the transistor TR17. The output of the transistor TR17 is applied to the base of a transistor TR18. Therefore, if all of the first to eighth blocks have a zener voltage, e.g., 10 V or higher, the transistor TR17 is maintained off and the transistor TR18 is maintained on. If any one of the first to eighth blocks becomes lower than 10 V, the transistor TR17 is turned on and the transistor TR18 is turned off. The collector voltage of the transistor TR18 is applied to a flip-flop made of NOR gates NOR7 and NOR8. The flip-flop has been reset by the initial resetting circuit and is outputting the "H" level, thus allowing the discharge operation. If any one of the blocks takes an insufficient voltage value and the transistor TR18 is turned off, the output of the NOR gate NOR8 becomes the "L" level.

The battery over voltage detecting circuit 41 functions to prevent excessive charging of the battery 11. It is constructed of a divider circuit made of serially connected resistors R86 and R87, zener diode ZD10 for detecting if the divided voltage is a predetermined value or greater, output transistors TR19 and TR20, and a flip-flop made of NOR gates NOR9 and NOR10 If the battery voltage is, for example, 165 V or less, no current flows through the zener diode ZD10. If so, transistor TR19 is maintained off and the transistor TR20 is maintained on, thus outputting an "H" level signal from the NOR gate NOR10 constituting the flip-flop and allowing the charge operation. As the battery 11 is charged and its voltage exceeds 165 V, a current flows through the zener diode ZD10 so that the transistor TR19 becomes on and the transistor TR20 becomes off. As a result, the output of the NOR gate NOR10 changes to the "L" level indicating the charge suspension.

A NAND gate NAND of the output control circuit 42 receives the following signals: an increasing current signal which is an outputted from a main circuit current detecting device (not shown) and takes the "L" level in a normal state and the "H" level when the output exceeds a preset value; a falling temperature signal which takes the "H" level when the temperature of the battery 11 reaches a value at which the battery becomes inoperable; an output from the charge period setting circuit 38 which takes the "H" level after the end of the charge period; an output from the charge end detecting circuit 40 which takes the "L" level in the charge suspension state and the "H" level in the discharge allowable state; and a signal from the battery over voltage detecting circuit 41 inverted by an inverter IV9 which takes the "H" level in the charge allowable state and the "L" level in the charge suspension state. Therefore, the NAND gate NAND outputs a charge suspension signal which takes the "L" level indicating no obstacle against the charge operation and the "H" level indicating an obstacle against the charge operation, and applies it to the gate driving circuit 35 of the charge control unit 200. The output control circuit 42 supplies an output, which takes the "L" level during the discharge suspension, from the output control circuit 42 inverted by the inverter IV9, to the gate driving circuit 26 of the discharge control unit 100. In addition, the output control circuit 42 operates to energize the power relay 18 and causes the contact 18a (FIG. 3) to open, in response to an output signal from the discharge end detecting circuit 40 which takes the "H" level in the discharge allowable state, and in response to an output signal from the battery over voltage detecting circuit 31 which takes the "H" level in the charge allowable state. If the NAND gate NAND outputs a charge suspension signal of the "L" level, the charge period setting circuit 38 is reset via an inverter IV7.

The operation of the above-described control units will be described in association with the running state of the air conditioning system.

At first, when the air conditioner starts to be driven, an output frequency of the inverter 4 is determined on the basis of the inputs of the sensor 8a and setting unit 8b, and an output of the inverter 4 is supplied to the motor 5 of the compressor 6.

Therefore, the compressor 6 starts to be driven at a rotational speed in accordance with the output frequency of the inverter 4.

The rectifier 12 detects a current supplied from the DC power source to the air conditioner while the compressor 6 is driven.

When power consumed by the compressor 6 increases with enlargement of the refrigerating cycle and/or the conditioner load, and when the detected current value of the rectifier 12 is over the set current value which is set by the discharge start current setting circuit 22, the difference between the set current value and the detected current value is amplified by the integration amplifier circuit 23, so that the gate driving circuit 26 causes the discharge FET 15 to turn on.

The battery 11 starts to discharge by an ON operation of the discharge FET 15, and the discharge current detecting circuit 24 detects the discharge current value.

When the discharge current from the battery 11 is over the difference of the amplified set current value and the detected current value, the comparator 25 causes the discharge FET to turn off.

The discharged current from the battery 11 decreases by OFF operation of the discharge FET 15. When the discharged current value having a hysteresis is less than the difference between the set current value and the detected current value, the discharge FET 15 is turned on again and the battery 11 starts to discharge.

The ON/OFF operation of the discharge FET 15 continues until the end of dcischarge detecting circuit 40 detects the discharge end of the battery 11, or until the detected current value by the rectifier circuit 12 is under the set current value set in the discharge start current setting circuit 22 on the basis where the refrigerating cycle and the conditioner load decrease.

When the discharge end of the battery 11 is detected by the end of discharge detecting circuit 40 as the voltage drop of the battery 11, after that, the discharge of the battery 11 stops until the battery 11 completes charging.

The charge operation of the battery 11 is performed on the conditions that (a) the discharge end detecting circuit 40 detects the end of discharge, (b) there is not a drop in temperature in the battery 11, (c) the battery over voltage detecting circuit 41 does not detect over voltage, and (d) the power source current is sufficiently lower than the set current value although the battery 11 is charged.

If the above conditions are filled and the battery 11 starts to charge for fifteen hours in all, the charge operation is over upon output of the charge period setting circuit 38.

The battery 11 stops charging when there is a temperature drop and an output of the battery over voltage detecting circuit 41 and power source current over the respective set values.

According to the first embodiment, the air conditioner system is provided with the discharge inhibiting circuit 31, so that excessive discharge of the battery can be avoided even if the power failure or the like occurs while the battery is connected.

Figure 10:
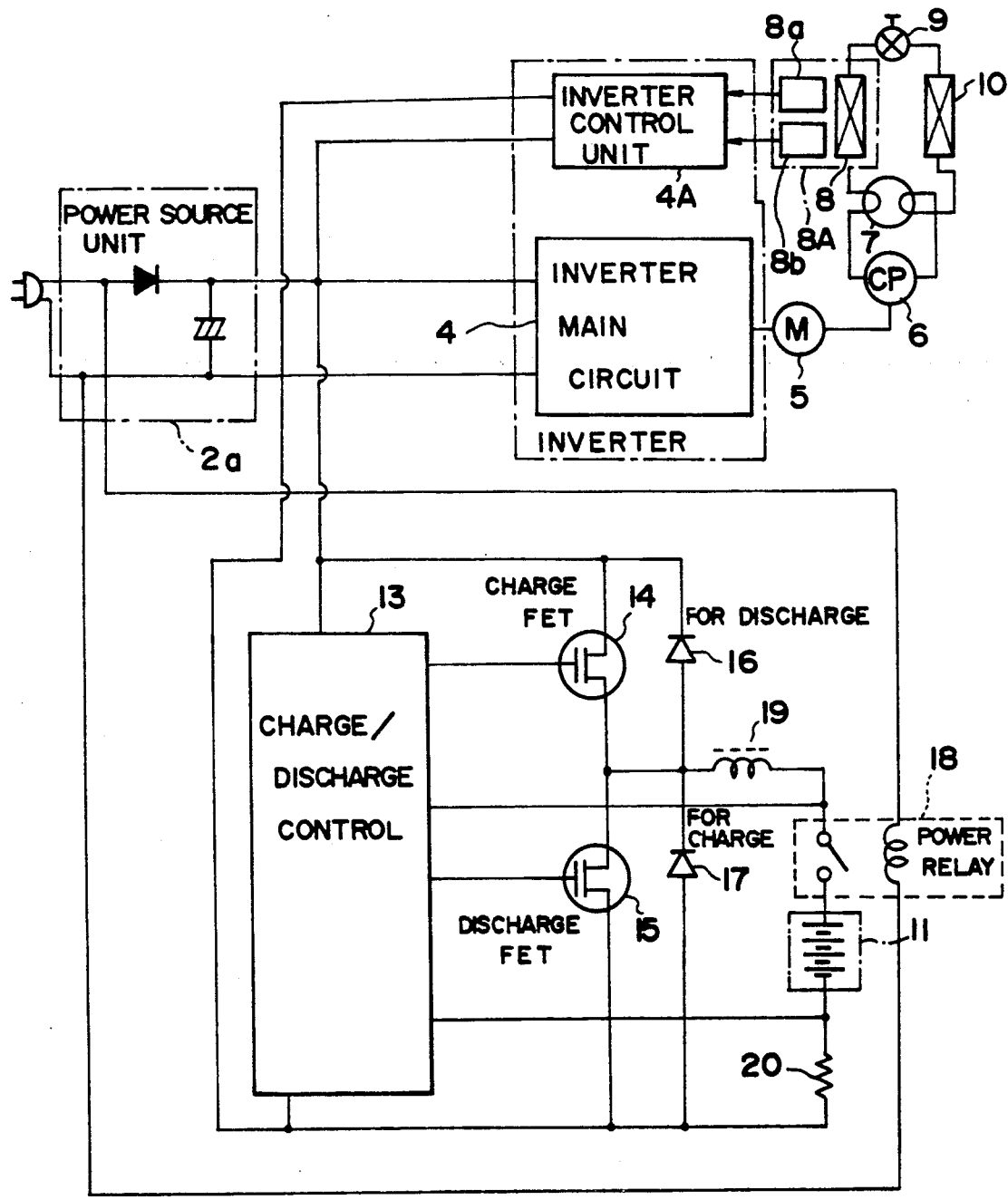
FIG. 10 is a block diagram showing the whole structure of a second embodiment of an air conditioning system of this invention.

The nickel cadmium battery as used in the first embodiment is considered inoperable after repeating charge/discharge of 500 times. However, according to experiments, the battery was operable after repeating charge/discharge 2000 times. Therefore, it can be concluded that the insufficient power of the air conditioner system can be supplemented with the battery provided at the system by properly controlling the charge/discharge operation. Namely, assuming that the battery is used for five months during the winter at the morning and night and charged during the other period, it can be used for about 7 years with only 150 charges/discharges per year. A second embodiment of the air conditioning system of this invention will be described next. FIG. 10 is a schematic circuit diagram showing the structure of the second embodiment of the air conditioner system with its main circuit system. In this figure, like elements to those shown in FIG. 3 are represented by identical reference numerals. A power source unit 2a as a converter contains therein a rectifying element and smoothing capacitor so that the power source unit 2a with a plug supplies a smoothed DC output upon insertion of the plug into a power receptacle. The power relay 18 is energized under control of the charge/discharge control circuit 13 in the first embodiment. However, in this embodiment, the excitation coil of the power relay 18 is directly coupled to the AC circuit of the power source unit 2a. With such an arrangement, the contact 18a of the power relay 18 is closed while the AC power source voltage is higher than the operating point to thus allow a charge/discharge operation. However, needless to say during the time while the power failure occurs, during the time while the AC power source voltage becomes lower than the operating point of the power relay 18, the contact 18a is opened to thus inhibit the charge/discharge operation.

As above, according to the second embodiment, excessive charge/discharge of the battery can also be avoided even if a power failure occurs.

As appreciated from the foregoing description of the present invention, there is provided a discharge inhibiting means for inhibiting discharge of the battery. Therefore, even if a power failure or the like occurs while the battery is connected and if the input power source voltage of the converter is not still established, excessive discharge of the battery can be avoided, thus not adversely affecting the life or capacity of the battery.

Furthermore, according to the present invention, if the input current of the converter exceeds a preset value, the battery is caused to be discharged while controlling the discharge current to a value corresponding to a difference between the input current of the converter and the preset value. Therefore, the amount of consumption of the battery power which is more expensive than the power from the AC power source can be suppressed to a low value, thus advantageously elongating the life of the battery and reducing the running cost of the air conditioning system.

What is claimed is:

1. An air conditioning system comprising:
    a converter for converting a first alternating current from a commercial alternating current power source into a first direct current,
    an inverter for re-converting said first direct current into a second alternating current having a predetermined frequency corresponding to an air conditioner load,
    a compressor driven with said second alternating current output by said invertor,
    a battery for supplying a second direct current to said invertor through a switching element, and
    a discharge control unit for controlling said switching element so that said battery supplies a magnitude of said second direct current corresponding to a difference between said first alternating current supplied from said power source to said converter and a preset current value when said first alternating current exceeds said preset current value.

2. An air conditioning system according to claim 1, wherein said discharge control unit comprises:
    an input current detecting circuit for detecting said first alternating current input from said power source and outputting a detected current signal,
    a discharge start current setting circuit for setting a current value at which said battery should start discharging and outputting a set current signal,
    an amplifier circuit for generating a discharge current signal corresponding to a discharge current of said battery by amplifying a difference between said detected current signal of said detecting circuit and said set current signal of said setting circuit when said detecting circuit detects a current greater than said current value of said setting circuit,
    a discharge current detecting circuit, provided between an output terminal of said converter and said battery, for detecting an actual discharge current of said battery and outputting an actual current signal,
    a comparator for comparing said actual current signal of said discharge current detecting circuit and said detected current signal of said amplifier circuit and for outputting a logic signal corresponding to a maximum and a minimum of said signals compared, and
    a driving circuit for controlling turn on and turn off of said switching element to discharge said battery on the basis of said logic signal output from said comparator.

3. An air conditioning system according to claim 2, wherein said amplifier circuit generates said discharge current signal corresponding to said discharge current of said battery by integrating and amplifying said difference between said signals from said input current detecting circuit and said discharge state current setting circuit when said signal from said input current detecting circuit is greater than said signal from said setting circuit.

4. An air conditioning system according to claim 2, wherein said discharge control unit further comprises a DC over voltage suppressing circuit for suppressing said discharge of said battery by reducing said signal from said amplifier circuit when a voltage supplied to said inverter is greater than a preset voltage value in order to suppress an over voltage supplied to said inverter.

5. An air conditioning system according to claim 2, wherein said discharge control unit further comprises a DC over voltage stopping circuit for outputting a first discharge stopping signal to said driving circuit when a voltage supplied to said inverter is greater than a preset voltage value in order to completely stop discharge operation of said battery.

6. An air conditioning system according to claim 2, wherein said discharge control unit further comprises an over current protecting circuit for outputting a second discharge stopping signal to said driving circuit when a discharge current detected by said discharge current detecting circuit is greater than said preset current value.

7. An air conditioning system according to claim 2, wherein said discharge control unit is provided within charge/discharge control means for subjecting said battery to charge/discharge and for outputting a discharge inhibiting command for inhibiting discharge of said battery if said first alternating current is smaller than said preset current value; and said charge/discharge control means outputting said discharge inhibiting command to excessive discharge preventing means when said first alternating current is smaller than said preset current value, said excessive discharge preventing means preventing supply of said second direct current by inhibiting a direct current supply path from said battery to said inverter.

8. An air conditioning system according to claim 7, wherein said discharge/discharge control means further comprises a charge control unit for controlling said battery to change said first direct current to said inverter when a voltage value of said first alternating current is sufficient for driving said inverter; and a charge/discharge control unit for controlling said battery to set a charge period on the basis of said first alternating current, to prevent an over voltage charge by detecting a voltage of said battery, and stopping said discharge of said battery.

9. An air conditioning system according to claim 8, wherein said charge control unit comprises, an integration amplifier circuit for generating a voltage corresponding to an actual charge current by integrating and amplifying a voltage across a shunt resistor provided between an output terminal of said converter and said battery;

a charge current setting circuit for outputting a signal which sets an optimum value suitable for charging said battery;

a comparator circuit for comparing a voltage corresponding to an actual charge current output from said integration amplifier circuit, with a signal for setting an optimum value output from said charge current setting circuit, and for outputting a logic signal corresponding to a comparison result; and a gate driving circuit for driving a charge field effect transistor in accordance with an output from said comparator circuit, and being supplied from a charge inhibiting signal for protecting a transistor which supplies a gate voltage to a gate electrode of said charge field effect transistor.

10. An air conditioning system according to claim 8, wherein said charge/discharge control unit comprises a clock generating circuit for receiving a power source voltage from said power source and generating a clock pulse at each zero crossing point of said power source voltage;

a charge period setting circuit for setting a charge period by counting clock pulses from said clock generating circuit;

an initial resetting circuit for generating a single pulse upon detection of a voltage of a control power source which generates various DC voltages from said alternating current power source, and for resetting said charge period setting circuit by using said single pulse;

a discharge end detecting circuit for outputting a discharge inhibiting signal when discharge of said battery has been completed when said voltage of said battery becomes lower than a preset value;

a battery over voltage detecting circuit for detecting an over voltage of said battery and outputting a charge inhibiting signal in order to inhibit charge of said battery when said battery has been fully charged; and an output control circuit for, if both of first and second conditions are met, said first condition being that a temperature of said battery is higher than a certain value and said second condition being that a supply current to said inverter is not increasing, outputting an on-charge signal to said discharge control unit for allowing discharge of said battery, for outputting a charge suspension signal to said charge control unit in order to suspend charge of said battery, and for outputting a control signal for controlling supply and interception of said first direct current from said battery to said inverter, in accordance with output signals from said charge period setting circuit, discharge end detecting circuit, and battery over voltage detecting circuit.

11. An air conditioning system according to claim 7, wherein said excessive discharge preventing means comprises a switch comprising a movable contact mounted between said battery connected to an output terminal of said converter and said switching element connected to an input terminal of said inverter; and a command circuit for opening said movable contact in accordance with said discharge inhibiting command from said charge/discharge control means.

12. An air conditioning system comprising;

a converter for converting a first alternating current from a commercial alternating current power source into a first direct current, an inverter for re-converting said first direct current into a second alternating current having a predetermined frequency corresponding to an air conditioner load, a compressor driven with said second alternating current output by said inverter, a battery for supplying a second direct current to said inverter through a switching element, and a discharge control unit for controlling said switching element so that said battery supplies a magnitude of said second direct current corresponding to a difference between said first alternating current supplied from said power source to said converter and a preset value;

wherein discharge of said battery is inhibited when a voltage value of said first alternating current from said power source applied to said converter is smaller than an allowable minimum value which would subject said battery to excessive discharge.

13. An air conditioning system according to claim 12, further comprising:

power source voltage detecting means for always detecting said voltage value of said alternating current power source input to said converter;

charge/discharge controlling means for judging if said voltage value detected by said detecting means is smaller than said allowable minimum value and, if said voltage value is smaller than said allowable minimum value, outputting a discharge inhibiting command for inhibiting discharge of said battery; and excessive discharge inhibiting means, responsive to said discharge inhibiting command output from said charge/discharge controlling means when said voltage value is smaller than said allowable minimum value, for inhibiting said second direct current from said battery by inhibiting a current supply path form said battery to said inverter.

14. An air conditioning system according to claim 13 wherein said power source voltage detecting means comprises a current transformer coupled to a parallel circuit of sid commercial power source and a rectifier circuit constituting said converter.

15. An air conditioning system according to claim 13 wherein said charge/discharge control means comprises, a discharge control unit for controlling discharge of said battery when sid voltage value of said power source detected by sid power source voltage detecting means exceeds a discharge start preset value, and for stopping discharge of said battery when said voltage value of said power source is smaller than said allowable minimum voltage value;

a charge control unit for controlling said battery for charging with said first direct current from said converter when said voltage value of said power source is a value insufficient for driving said inverter; and a charge/discharge control unit for generating a constant clock pulse in accordance with a voltage of said AC power source to set a charge period based on said clock pulse, for controlling said battery to avoid an over voltage charge by detecting a voltage value of said battery, and for checking a discharge end by detecting a voltage across one block of said battery during said charge period.

16. an air conditioning system according to claim 15, wherein said charge control unit comprises, an input current detecting circuit for detecting a current of said power source on the basis of an output signal from said power source voltage detecting means;

a discharge start current setting circuit for determining a current value at which discharge of said battery is caused to start;

an integration amplifier circuit for integrating a difference between a detected output from said detecting circuit and a set output from said setting circuit if said detected output exceeds a value of said set output, and generating a voltage signal corresponding to a discharge current of said battery;

a discharge current detecting circuit for detecting an actual discharge current of said battery based on a voltage across a shunt resistor provided between an output terminal of said converter and said battery;

a comparator circuit for comparing an output signal from said discharge current detecting circuit with an output signal from said integration amplifier circuit, and outputting a logical signal corresponding to a comparison result;

a gate driving circuit for controlling turn on and off of a discharge field effect transistor which causes said battery to be discharged, in accordance with said logical signal from said comparator circuit;

a small input inhibiting circuit for outputting a discharge inhibiting signal to said gate driving circuit so as to not perform discharge control in accordance with an output rom said input current detecting circuit if said voltage of sid power source is smaller than said allowable minimum voltage value;

a DC over voltage suppressing circuit for suppressing an over voltage supplied to said inverter, by suppressing discharge by lowering said difference integrated by said integration amplifier circuit when said supply voltage to said inverter exceeds a preset value;

an over current protecting circuit for outputting a charge inhibiting signal to said gate driving circuit when an output from said discharge current detecting circuit exceeds a preset value;

a DC over voltage stopping circuit for outputting a discharge inhibiting signal to said gate driving circuit in order to fully stop a discharge operation of said battery when said supply voltage to said inverter becomes excessive and exceeds a preset value; and a discharge inhibiting circuit for outputting a discharge inhibiting signal to said gate driving circuit in order to inhibit said discharge operation when a control voltage derived from said power source is smaller than a preset value.

17. An air conditioning system according to claim 15, wherein said charge control unit comprises an integration amplifier circuit for generating a voltage corresponding to an actual charge current by integrating and amplifying a voltage across a shunt resistor provided between an output terminal of said converter and said battery;

a charge current setting circuit for outputting a signal which sets an optimum value suitable for charging said battery;

a comparator circuit for comparing a voltage corresponding to an actual charge current output from said integration amplifier circuit with a signal for setting an optimum value output from said charge current setting circuit, and outputting a logical signal corresponding to a comparison result; and a gate driving circuit for driving a charge field effect transistor in accordance with an output from said comparator circuit, supplied with a charge inhibiting signal for protecting a transistor which supplies a gate voltage to the gate electrode of said charge field effect transistor.

18. An air conditioning system according to claim 15 wherein said charge/discharge control comprises a clock generating circuit for receiving said voltage from said power source and for generating a clock pulse at each zero crossing point;

a charge period setting circuit for setting a charge period by counting said clock pulse from said clock generating circuit;

an initial resetting circuit for generating a single pulse upon detection of an voltage of a control power source which generates various DC voltages from said alternating current power source, and for resetting said charge period setting circuit by using said single pulse;

a discharge end detecting circuit for outputting a discharge inhibiting signal when discharge of said battery has been completed when a voltage of said battery becomes lower than a preset value;

a battery over voltage detecting circuit for detecting an over voltage of said battery and outputting a charge inhibiting signal, in order to inhibit charge of said battery when sid battery has been fully charged; and an output control circuit for, if both of first and second conditions are met, said first condition being that a temperature of sid battery is higher than a certain value and said second condition being that a supply current to said inverter is not increasing, outputting an on-charge signal to said discharge control unit for allowing discharge of said battery, a charge suspension signal to said charge control unit in order to suspend charge of said battery, and a control signal for controlling supply and interception of said second direct current from said battery to said inverter, in accordance with output signals from sid charge period setting circuit, said charge end detecting circuit and said battery over voltage detecting circuit.

19. An air conditioning system according to claim 12, further comprising:

charge/discharge controlling means for controlling a charge/discharge operation of said battery by detecting a voltage value of said power source inputted to said converter and for judging if a detected voltage value is a supply voltage value which is insufficient so that said battery would be subjected to an excessive discharge; and charge/discharge inhibiting means directly connected in parallel with a power source circuit constituting said converter for inhibiting said charge/discharge operation by closing a circuit opening/closing switch when an output voltage of said converter is smaller than a preset value, said circuit opening/closing switch being connected in parallel with said charge/discharge controlling means and connected serially to said battery, and said circuit opening/closing switch being closed when said battery is subjected to said charge/discharge operation and opened when charge/discharge of said battery is stopped.

20. An air conditioning system according to claim 19, wherein said discharge inhibiting means comprises a relay comprising a relay contact connected in parallel between said converter and said converter and serially connected to said battery, and a relay coil connected in parallel with a power source device constituting said converter.

* * * * *